United States Patent
Kim et al.

(10) Patent No.: US 7,391,889 B2
(45) Date of Patent: Jun. 24, 2008

(54) METHOD AND APPARATUS FOR EXTRACTING FEATURE VECTOR USED FOR FACE RECOGNITION AND RETRIEVAL

(75) Inventors: Hyun-woo Kim, Kyungki-do (KR); Toshio Kamei, Kanagawa (JP); Tae-kyun Kim, Kyungki-do (KR); Won-jun Hwang, Seoul (KR); Seok-cheol Kee, Kyungki-do (KR)

(73) Assignees: Samsung Electronics Co., Ltd., Suwon, Kyungki-Do (KR); NEC Corporation, Minato-Ku, Tokyo (JP)

(*) Notice: Subject to any disclaimer, the term of this patent is extended or adjusted under 35 U.S.C. 154(b) by 721 days.

(21) Appl. No.: 10/685,002

(22) Filed: Oct. 15, 2003

(65) Prior Publication Data

US 2004/0170305 A1    Sep. 2, 2004

(30) Foreign Application Priority Data

Oct. 15, 2002  (KR)  ............. 10-2002-0062650
Apr. 25, 2003  (KR)  ............. 10-2003-0026426

(51) Int. Cl.
  *G06K 9/00*   (2006.01)
(52) U.S. Cl. .................................... 382/118
(58) Field of Classification Search ......... 382/115–118, 382/190, 191, 195, 201, 205, 206, 225
See application file for complete search history.

(56) References Cited

U.S. PATENT DOCUMENTS 5,917,940 A * 6/1999 Okajima et al. ............. 382/173
5,956,427 A * 9/1999 Greenspan et al. ......... 382/240
5,982,912 A * 11/1999 Fukui et al. ................ 382/118
6,466,685 B1 * 10/2002 Fukui et al. ................ 382/115
2005/0201595 A1 * 9/2005 Kamei ......................... 382/118

OTHER PUBLICATIONS

Baback Moghaddam et al., "Face Recognition using View-based and Modular Eigenspaces", 1994, pp. 1-7, M.I.T. Media Laboratory Perceptual Computing Section Technical Report No. 301, Automatic Systems for the Identification and Inspection of Humans, SPIE 1994, vol. 2277, USA.

(Continued)

*Primary Examiner*—Matthew C. Bella
*Assistant Examiner*—Dennis Rosario
(74) *Attorney, Agent, or Firm*—Buchanan Ingersoll & Rooney PC

(57) ABSTRACT

A method and apparatus for extracting feature vectors for face recognition and retrieval are provided. An entire Fourier feature vector is generated for an entire face area of a normalized face image using first and second normalized vectors, and a central Fourier feature vector is generated for a central face area of the normalized face image using third and fourth normalized vectors. An entire intensity feature vector is generated for the entire face area, and a local intensity feature vector is generated for a predetermined number of face component-wise areas. An entire composite feature vector is generated by coupling the first and second normalized vectors and the entire intensity feature, and a central composite feature vector is generated by coupling the third and fourth normalized vectors and the local intensity feature vectors.

21 Claims, 9 Drawing Sheets

OTHER PUBLICATIONS

Tae-Kyun Kim et al., "Component-Based LDA Face Descriptor for Image Retrieval", 2002, British Machine Vision Conference.

Toshio Kamei et al., "Report of the Core Experiments on Fourier Spectral PCLDA Based Face Descriptor", ISO/IEC JTC1/SC29/WG11,2002, MPEG2002/M8559, Klagenfurt, Austria.

B.S. Manjunath et al., "Face Descriptor", Introduction to MPEG-7: Multimedia Content Description Interface, 2002, pp. 181-185, John Wiley & Sons, West Sussex, England.

Hagen Spies et al., "Face Recognition in Fourier Space", Proc. Of Vision Interface, 2000, pp. 38-44, Montreal, Canada.

J. Huang et al., "Combining Local and Global Features for Face Recognition", Proc Asian Conf. on Computer Vision, 2002, pp. 568-573, Melbourne, Australia.

Jian Huang Lai et al., Face Recognition Using Holistic Fourier Invariant Features°, 2001, pp. 95-109, Pattern recognition, Pergamon Press Inc. Elmsford, New York.

Tae-Kyun Kim et al., Component-Based LDA Face Descriptor for Image Retrieval°, 2002, pp. 507-516, Proc. British Machine Vision Conference.

* cited by examiner

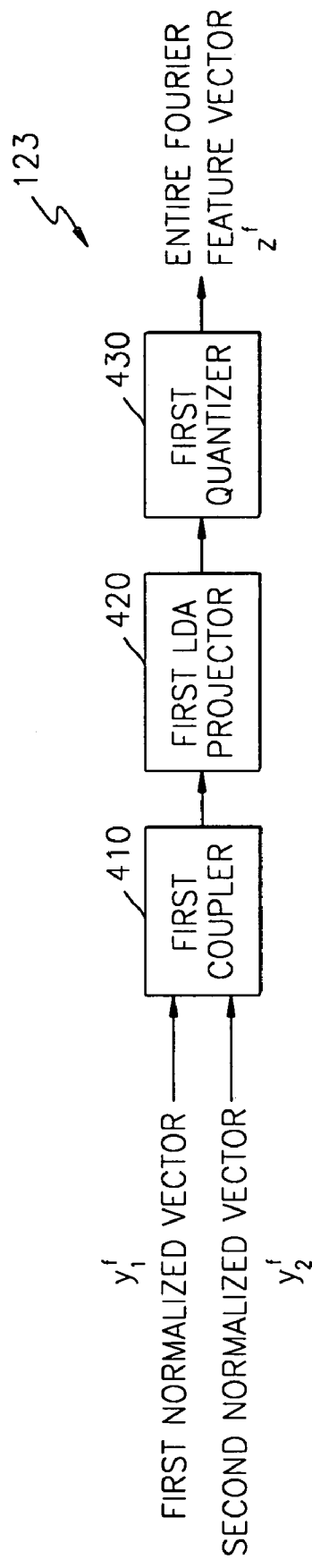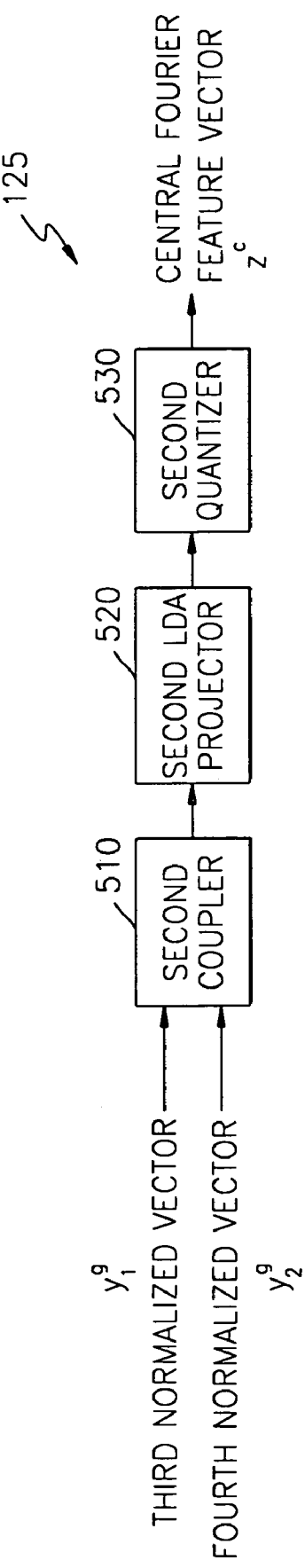

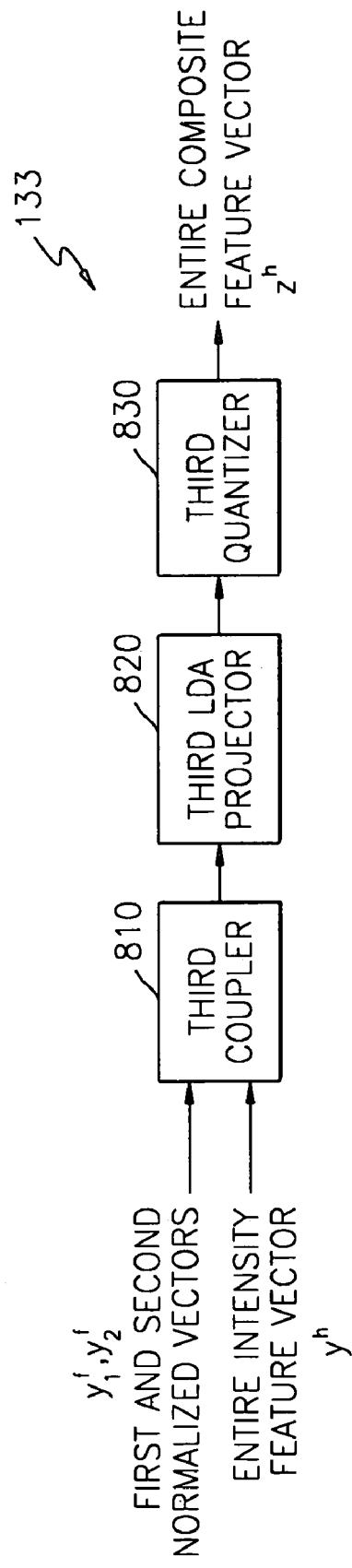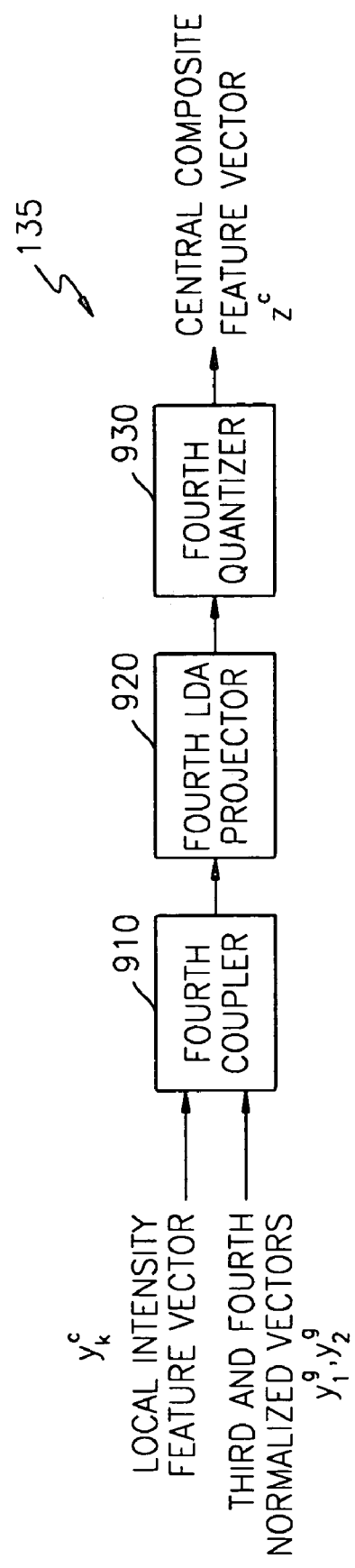

METHOD AND APPARATUS FOR EXTRACTING FEATURE VECTOR USED FOR FACE RECOGNITION AND RETRIEVAL

This application claims the priority of Korean Patent Application Nos. 2002-62650 and 2003-26426, filed on Oct. 15, 2002 and Apr. 25, 2003, respectively in the Korean Intellectual Property Office, the disclosures of which are incorporated herein in their entirety by reference.

BACKGROUND OF THE INVENTION

1. Field of the Invention

The present invention relates to a face recognition and retrieval system, and more particularly, to a method and apparatus for extracting a feature vector used for face searching and recognition, which can overcome the limits of feature vectors generated in a frequency domain and a spatial domain by separately generating a Fourier feature vector and an intensity feature vector for a normalized face image and then merging the Fourier feature vector and the intensity feature vector.

2. Description of the Related Art

In the "information society" we now live in, personal information or specific groups' information are considered worth more than other properties. In order to protect such valuable information from third persons, it is very important to develop a variety of techniques capable of efficiently recognizing the identify of people who attempt to access the information. Among currently available identification techniques, face recognition has been considered as the most convenient and most efficient identification method because it can be used to recognize a person's identify without letting the person realize that his/her identity is being checked and does not require a person to move or act in a specific way during an identification process.

Even though social demands for end-user products, such as credit cards, debit cards, or electronic IDs, which inevitably require an identification process, have become stronger, only a few identification techniques, including password-based identification techniques, have been proven effective. Lack of alternative identification techniques to the password-based identification techniques has sprouted many social problems, such as identity-theft crimes using computers. Since face recognition is believed to be able to solve these problems, it has been drawing tremendous attention from the public so far. In addition, face recognition has a great possibility of being applied to many different fields, such as terminal access control, public places control, electronic photo albums, and criminal face recognition.

In the meantime, there are many different types of face recognition techniques. One of those techniques is a principal component analysis (PCA)-based face recognition technique. PCA is a method of compressing data by projecting image data onto a low-dimension vector space while minimizing data loss. The PCA-based face recognition technique is capable of recognizing a face image by extracting major feature vectors from the face image and classifying the face image into a predetermined category based on the extracted major feature vectors. However, this technique has problems, such as low recognition speed and low reliability. Even though this technique shows some degree of reliability irrespective of variations in the lightness of a face image, it has failed to provide reliable and satisfactory face recognition results for different face expressions and poses.

In order to overcome the limits of the PCA-based face recognition technique, a method of extracting feature vectors from a face image in a frequency domain by using principal component linear discriminant analysis (PCLDA) has been suggested by Toshio Kamei et al. in "Report of the core experiments on Fourier spectral PCLDA based face descriptor," ISO-IEC-JTC1-SC29WG11, M8559, Klagenfurt, Austria, October 2002, and a method of extracting component-wise feature vectors in a spatial domain by using LDA has been suggested by Tae-kyun Kim "Component-based LDA Face Descriptor for Image Retrieval," British Machine Vision Conference 2002, September 2002. These two methods, however, have distinct limitations in terms of-precision of face recognition and retrieval, partly because they solely take advantage of either frequency-domain feature vectors or spatial-domain feature vectors.

SUMMARY OF THE INVENTION

The present invention provides a method of extracting feature vectors for face recognition and retrieval, which can overcome the limits of feature vectors generated in a frequency domain and a spatial domain by separately generating a Fourier feature vector and an intensity feature vector for a normalized face image and then merging the Fourier feature vector and the intensity feature vector.

The present invention also provides an apparatus for extracting a feature vector used for face recognition and retrieval, which uses the method of extracting feature vectors for face recognition and retrieval.

According to an aspect of the present invention, there is provided a method of extracting feature vectors for face recognition and retrieval. An entire Fourier feature vector is generated for an entire face area of a normalized face image using first and second normalized vectors, and a central Fourier feature vector is generated for a central face area of the normalized face image using third and fourth normalized vectors. An entire intensity feature vector is generated for the entire face area, and a local intensity feature vector is generated for a predetermined number of face component-wise areas. An entire composite feature vector is generated by coupling the first and second normalized vectors and the entire intensity feature, and a central composite feature vector is generated by coupling the third and fourth normalized vectors and the local intensity feature vectors.

According to another aspect of the present invention, there is provided an apparatus for extracting feature vectors for face recognition and retrieval, including a first unit and a second unit. The first unit generates an entire Fourier feature vector for an entire face area of a normalized face image using first and second normalized vectors, and generates a central Fourier feature vector for a central face area of the normalized face image using third and fourth normalized vectors. The second unit generates an entire intensity feature vector for the entire face image and a local intensity feature vector for a predetermined number of face component-wise areas, generates an entire composite feature vector by coupling the first and second normalized vectors and the entire intensity feature vector, and generates a central composite feature vector by coupling the third and fourth normalized vectors and the local intensity feature vector.

According to still another aspect of the present invention, there is provided a computer-readable recording medium on which a program enabling the method of extracting feature vectors for face recognition and retrieval is recorded.

BRIEF DESCRIPTION OF THE DRAWINGS

The above and other features and advantages of the present invention will become more apparent by describing in detail exemplary embodiments thereof with reference to the attached drawings in which:

FIG. 4 is a detailed block diagram of an entire Fourier feature vector generator shown in FIG. 1;

FIG. 5 is a detailed block diagram of a central Fourier feature vector generator shown in FIG. 1;

FIG. 8 is a detailed block diagram of an entire composite feature vector generator shown in FIG. 1;

FIG. 9 is a detailed block diagram of a central composite feature vector generator shown in FIG. 1.

DETAILED DESCRIPTION OF THE INVENTION

The present invention will now be described more fully with reference to the accompanying drawings in which preferred embodiments of the invention are shown.

Figure 1:
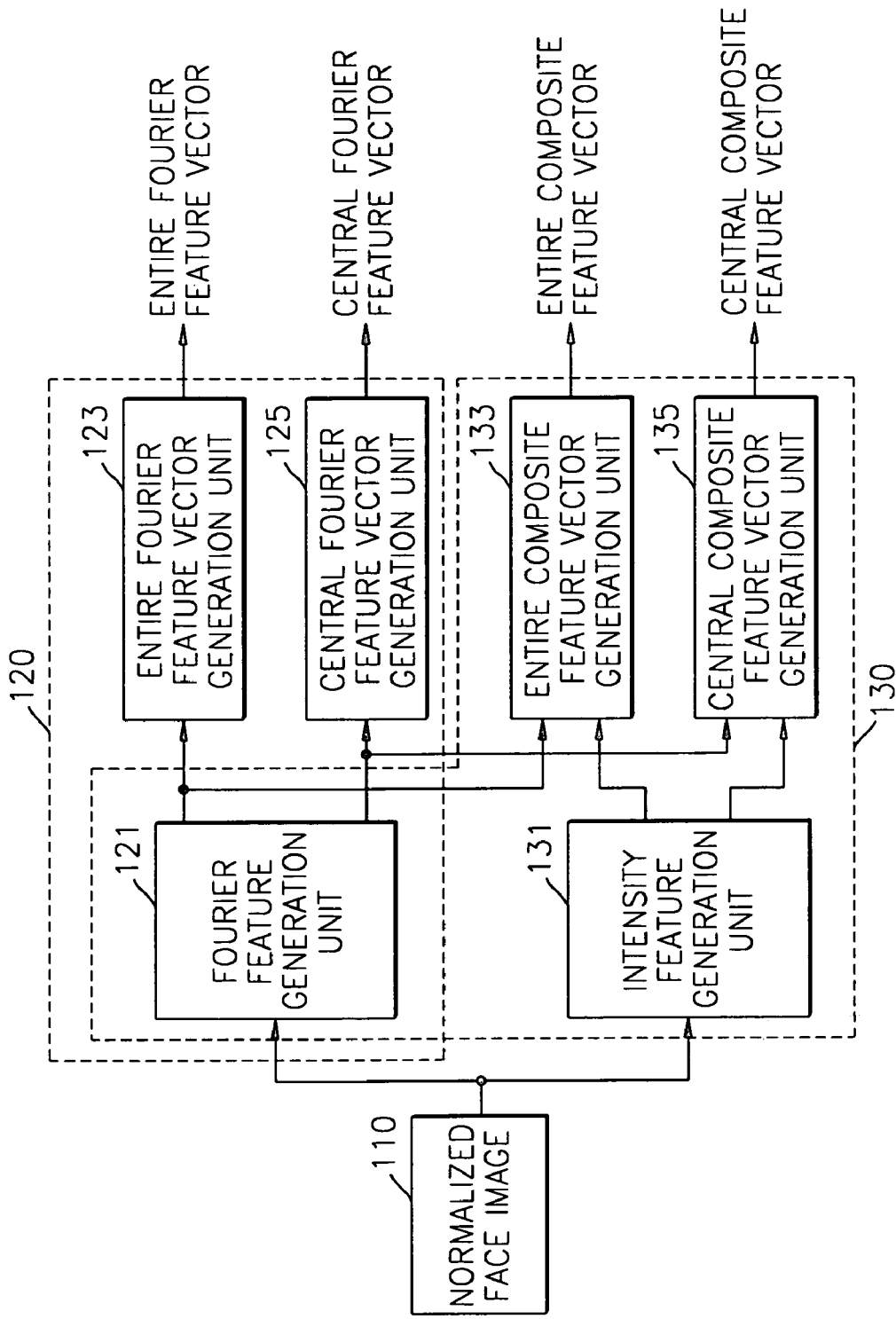
FIG. 1 is a block diagram of an apparatus for extracting a feature vector used for face recognition and retrieval according to a preferred embodiment of the present invention.

FIG. 1 is a block diagram of an apparatus for extracting a feature vector used for face recognition and retrieval according to a preferred embodiment of the present invention. Referring to FIG. 1, the apparatus is comprised of a frequency feature vector generation unit 120 and a composite feature vector generation unit 130. The frequency feature vector generation unit 120 includes a Fourier feature generation unit 121, an entire Fourier feature vector generation unit 123, and a central Fourier feature vector generation unit 125, and the composite feature vector generation unit 130 includes a Fourier feature generation unit 121, an intensity feature generation unit 131, an entire composite feature vector generation unit 133, and a central composite feature vector generation unit 135.

As shown in FIG. 1, a normalized face image 110 is obtained by scaling an original face image into, for example, 56 lines, in which case each line is comprised of, for example, 46 pixels. The center of the right eye in the original face image is located in the $24^{th}$ column and $16^{th}$ row of the normalized face image 110, and the center of the left eye is located in the $24^{th}$ column and $31^{st}$ row of the normalized face image 110.

In the frequency feature vector generation unit 120, the Fourier feature generation unit 121 performs Fourier transformation on the normalized face image 110, i.e., an entire face area and a central face area, thus obtaining the Fourier spectra and Fourier amplitudes of the entire face area and the central face area, defines first and second feature vectors using the Fourier spectrum and Fourier amplitude of the entire face area, and defines third and fourth feature vectors using the Fourier spectrum and Fourier amplitude for the central face area. The first through fourth feature vectors are projected onto a principal component linear discriminant analysis (PCLDA) sub-space and then are normalized into unit vectors. The first and second normalized vectors are feature vectors for the entire face area, and the third and fourth normalized vectors are feature vectors for the central face area. Here, Fourier feature vectors are obtained by encoding spatial relations between pixels constituting the normalized face image 110.

The entire Fourier feature vector generation unit 123 combines the first and second normalized vectors, provided by the Fourier feature generation unit 121, into a single combined vector, projects the combined vector onto a discriminant space defined by a predetermined basis matrix, quantizes each component of the projected vector in a predetermined manner, and stores the quantized vector as an entire Fourier feature vector.

The central Fourier feature vector generation unit 125 combines the third and fourth normalized vectors, provided by the Fourier feature generation unit 121, into a single combined vector, projects the combined vector onto a discriminant space defined by a predetermined basis matrix, quantizes each component of the projected vector in a predetermined manner, and stores the quantized vector as a central Fourier feature vector.

In the composite feature vector generation unit 130, the intensity feature generation unit 131 carries out pose estimation and compensation on the normalized face image 110, projects an entire face area and a predetermined number of components of the normalized face image 110, for example, 5 components of the normalized face image 110, among portions of the pose-compensated face image into the PCLDA sub-space, and normalizes the projection results into fifth and sixth unit vectors. An entire intensity feature vector for the entire face area is a fifth feature vector, which has been normalized into the fifth unit vector, and local intensity feature vectors for portions of the normalized face image 110 are sixth through tenth feature vectors, each of which has been normalized into the sixth unit vector. Here, the intensity feature vectors are obtained by encoding variations in the intensity of the pixels constituting the entire face area and the five components of the normalized face image 110.

The entire composite feature vector generation unit 133 combines the first and second normalized vectors, provided by the Fourier feature generation unit 121, and the entire intensity feature vector, provided by the intensity feature generation unit 131, into a single combined vector, projects the combined vector onto a discriminant space defined by a predetermined basis matrix, quantizes each component of the projected vector in a predetermined manner, and stores the quantized vector as an entire composite feature vector.

The central composite feature vector generation unit 135 combines the third and fourth normalized vectors, provided by the Fourier feature generation unit 121, and the local intensity feature vectors, provided by the intensity feature generation unit 131, into a single combined vector, projects the combined vector onto a discriminant space defined by a predetermined basis matrix, quantizes each component of the projected vector in a predetermined manner, and stores the quantized vector as a central composite feature vector.

Figure 2:
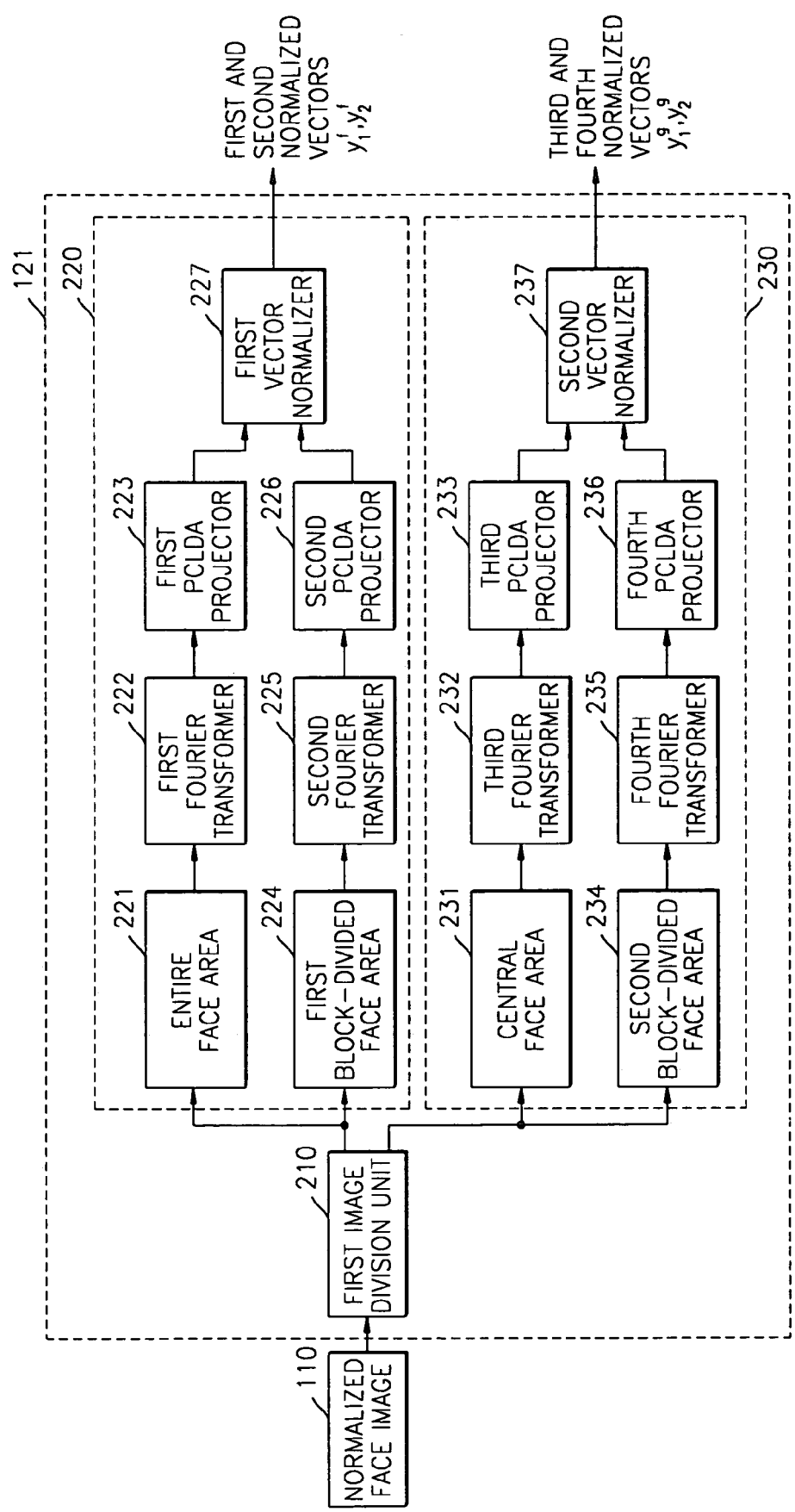
FIG. 2 is a detailed block diagram of a Fourier feature generator shown in FIG. 1.

FIG. 2 is a detailed block diagram of the Fourier feature generation unit 121 of FIG. 2. Referring to FIG. 2, the Fourier feature generation unit 121 includes a first image division unit 210, an entire Fourier feature vector generator 220, and a central Fourier feature vector generator 230. The entire Fourier feature vector generator 220 includes first and second Fourier transformers 222 and 225, first and second PCLDA projectors 223 and 226, and a first vector normalizer 227. The central Fourier feature vector generator 230 includes a third Fourier transformer 231, third and fourth PCLDA projectors 233 and 234, and a second vector normalizer 235.

As shown in FIG. 2, the first image division unit 210 divides the normalized face image 110 into an entire face area 221, a block-divided face area 224, and a central face area 231.

The entire Fourier feature vector generator 220 obtains a Fourier spectrum of the entire face area 221 and Fourier amplitude of the block-divided face area 224 and then generates an entire Fourier feature vector using the Fourier spectrum and Fourier amplitude, a process which will become more apparent in the following paragraphs.

The first Fourier transformer 222 performs Fourier transformation on the entire face area 221, thus converting the entire face area 221 into a frequency-domain component. Supposing that the entire face area 221 is represented by f(x, y), the Fourier spectrum F(u, v) can be expressed by the following equation.

$$F(u, v) = \sum_{x=0}^{M-1} \sum_{y=0}^{N-1} f(x, y) \exp\left(-2\pi i \left(\frac{xu}{M} + \frac{yv}{N}\right)\right) \quad (1)$$

In Equation (1), M=46, N=56, u=0, 1, 2, ..., and v=0, 1, 2, ..., 55. F(0, 0) indicates a DC component. The Fourier spectrum F(u, v) is used for obtaining a first feature vector $x_1^f$ whose elements are defined by a real number portion Re[F(u, v)] and a imaginary number portion Im[F(u, v)] obtained by raster-scanning the Fourier spectrum F(u, v). More specifically, the raster scanning is carried out on all components of scanning areas A and B except for high frequency components (u=12, 13, ..., 34), as defined in Table 1 below. Table 1 shows raster scanning parameters used for extracting feature vectors from a Fourier domain.

$$x_1^f = \begin{pmatrix} \text{Re}[F(0, 0)] \\ \text{Re}[F(1, 0)] \\ \vdots \\ \text{Re}\left[F\left(M-1, \frac{N}{4}-1\right)\right] \\ \text{Im}[F(0, 0)] \\ \text{Im}[F(1, 0)] \\ \vdots \\ \text{Im}\left[F\left(M-1, \frac{N}{4}-1\right)\right] \end{pmatrix} \quad (2)$$

The first PCLDA projector 223 projects the first feature vector $x_1^f$, obtained by the first Fourier transformer 222, onto a discriminant space obtained by carrying out PCLDA on the first feature vector $x_1^f$. The discriminant space is defined by a first basis matrix $\Psi_1^f$, which is obtained using a predetermined well-known algorithm and is also well known to those skilled in the art.

Figure 3A:
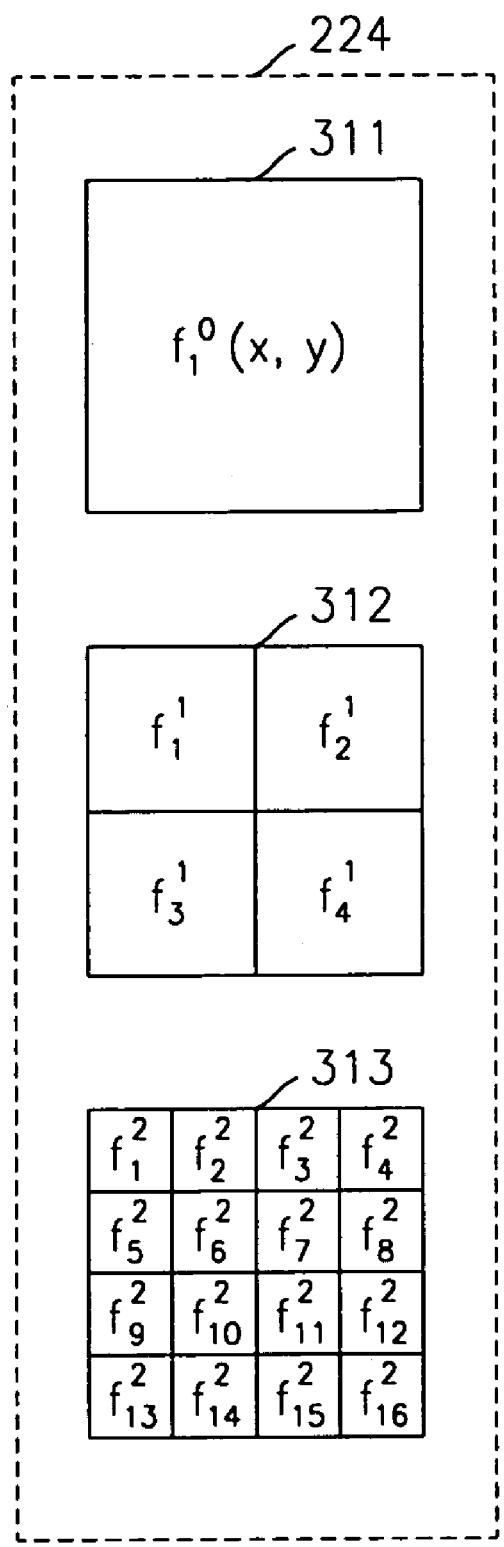
FIGS. 3A and 3B are detailed block diagrams illustrating a block-divided facial area shown in FIG. 2.

The second Fourier transformer 225 converts the block-divided face area 224 into a frequency domain by performing Fourier transformation on the block-divided face area 224. The block-divided face area 224, as shown in FIG. 3A, includes three sub-spaces, i.e., an entire area 311, a four-block area 312, and a sixteen-block area 313. The Fourier transformation is performed on each of the sub-spaces of the block-divided face area 224. Here, the entire area 311, represented by $f_1^0(x, y)$, is obtained by removing boundary rows of the normalized face image 110 and clipping a resulting face image into a 44×56 image. $f_1^0(x, y)$ can be represented by Equation (3) below.

TABLE 1

| Feature Vector | Feature | Scan Area A | | Scan Area B | | Vector Dimension | | |
|---|---|---|---|---|---|---|---|---|
| | | $S_A$ | $E_A$ | $S_B$ | $E_B$ | Subtotal | Number of Blocks | Total |
| $x_1^f$ | Re[F(u, v)] | (0, 0) | (11, 13) | (35, 0) | (45, 13) | 322 | — | 644 |
| | Im[F(u, v)] | (0, 0) | (11, 13) | (35, 0) | (45, 13) | 322 | — | |
| $x_2^f$ | $|F_1^0(u, v)|$ | (0, 0) | (10, 13) | (33, 0) | (43, 13) | 308 | 1 | 856 |
| | $|F_k^1(u, v)|$ | (0, 0) | (5, 6) | (17, 0) | (21, 6) | 77 | 4 | |
| | $|F_k^2(u, v)|$ | (0, 0) | (2, 2) | (9, 0) | (10, 2) | 15 | 16 | |
| $x_1^g$ | Re[G(u, v)] | (0, 0) | (7, 7) | (24, 0) | (31, 7) | 128 | — | 256 |
| | Im[G(u, v)] | (0, 0) | (7, 7) | (24, 0) | (31, 7) | 128 | — | |
| $x_2^g$ | $|G_1^0(u, v)|$ | (0, 0) | (7, 7) | (24, 0) | (31, 7) | 128 | 1 | 384 |
| | $|G_k^1(u, v)|$ | (0, 0) | (3, 3) | (12, 0) | (15, 3) | 32 | 4 | |
| | $|G_k^2(u, v)|$ | (0, 0) | (1, 1) | (6, 0) | (7, 1) | 8 | 16 | |

Figure 10:
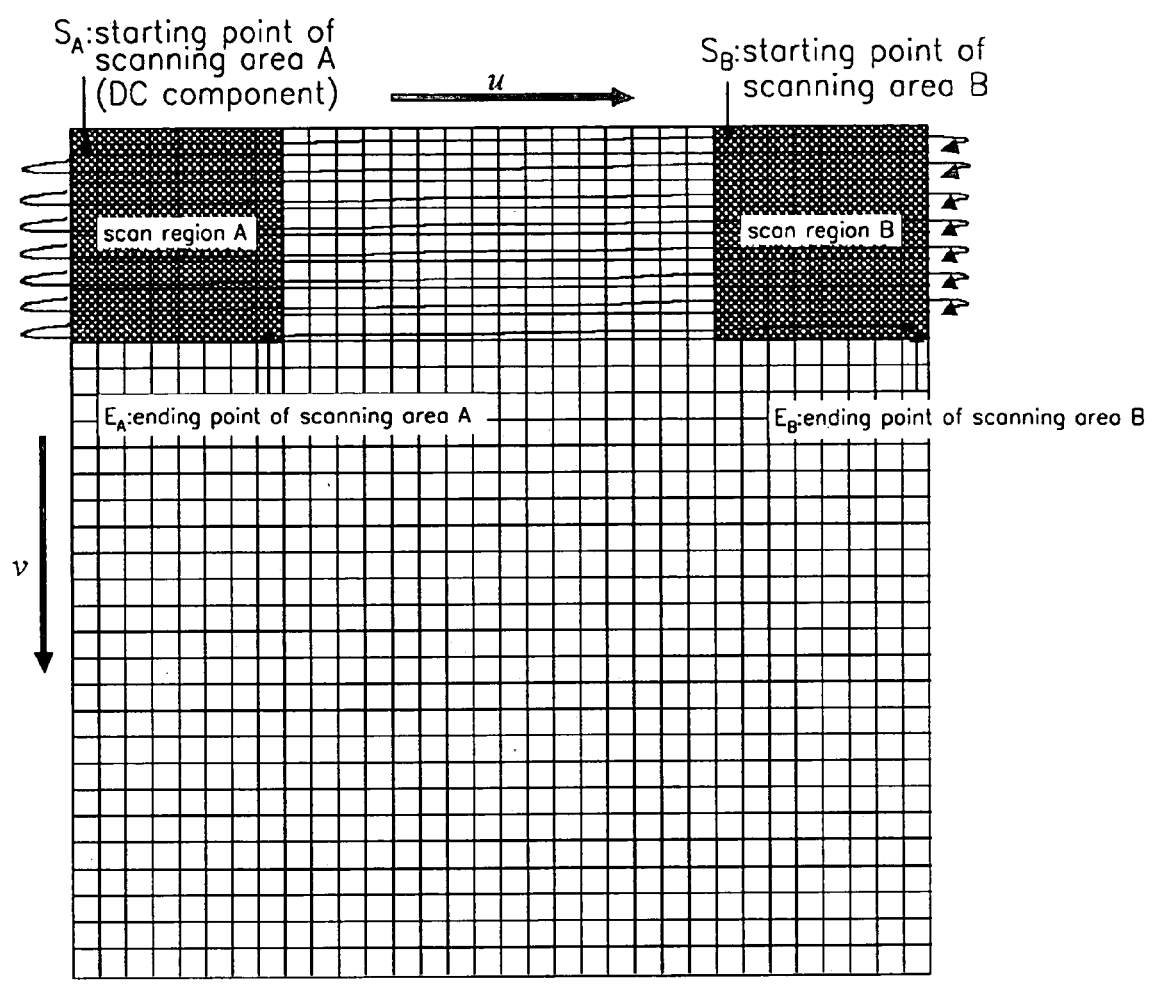
FIG. 10 is a diagram illustrating raster scanning, adopted by the Fourier feature generator shown in FIG. 1.

In Table 1, $S_A$ and $S_B$ represent starting points of the scanning areas A and B, respectively, and $E_A$ and $E_B$ represent ending points of the scanning areas A and B, respectively. Examples of the scanning areas A and B and the raster scanning are illustrated in FIG. 10. As shown in FIG. 10, Fourier components are extracted from the scanning areas A and B through raster scanning performed along a 'u' direction.

The first feature vector $x_1^f$ which is obtained as a result of the raster scanning, can be expressed by Equation (2) below. Here, the first feature vector $x_1^f$ is a dimension of 644.

$$f_1^0(x, y) = f(x+1, y) \quad (3)$$

In Equation (3), x=0, 1, 2, ..., 43, and y=0, 1, 2, ..., 55.

The four-block area 312, which is represented by $f_k^1(x, y)$, and the sixteen-block area 313, which is represented by $f_k^2(x, y)$, are obtained using the entire area 311. Specifically, the four-block area 312 is obtained by dividing the entire area 311 into four identical blocks having a 22×28 size. $f_k^1(x, y)$ can be represented by Equation (4) below.

$$f_k^1(x, y) = f_1^0(x + 22s_k^1, 28t_k^1) \quad (4)$$

In Equation (4), k=1, 2, 3, 4, x=0, 1, 2, ..., 21, y=0, 1, 2, ..., 27, $s_k^1$=(k-1)mod 2, and $$t_k^1 = \text{round}\left(\frac{k-1}{2}\right).$$

The sixteen-block area 313, which is represented by $f_k^2(x, y)$, is obtained by dividing the entire area 311 into 16 identical blocks having an 11×14 size. $f_k^2(x,y)$ can be expressed by Equation (5) below.

$$f_k^2(x,y)=f_1^0(x+11s_k^2, y+14t_k^2) \quad (5)$$

In Equation (5), k=1, 2, 3, ..., 16, x=0, 1, 2, ..., 10, y=0, 1, 2, ..., 13, $s^2$=(k-1)mod 4, and $$t_k^2 = \text{round}\left(\frac{k-1}{4}\right).$$

A Fourier spectrum $F_k^j(u, v)$ and Fourier amplitude $|F_k^j(u, v)|$ are obtained as results of the Fourier transformation performed on the entire area 311, the four-block area 312, and the sixteen-block area 311 by the second Fourier transformer 225 and can be expressed by Equations (6) and (7), respectively.

$$F_k^j(u, v) = \sum_{x=0}^{M^j-1} \sum_{y=0}^{N^j-1} f_k^j(x, y)\exp\left(-2\pi i\left(\frac{xu}{M^j} + \frac{yv}{N^j}\right)\right) \quad (6)$$

$$|F_k^j(u, v)| = \sqrt{\text{Re}[F_k^j(u, v)]^2 + \text{Im}[F_k^j(u, v)]^2} \quad (7)$$

In Equation (7), Re(z) and Im(z) represent the real number portion and imaginary number portion, respectively, of a complex number z. $M^j$ represents the width of the entire area 311 or the width of each sub-block of the four-block area 312 or the sixteen-block area 313. For example, $M^0$=44, $M^1$=22, and $M^2$=11. $N^j$ represents the height of the entire area 311 or each sub-block of the four-block area 312 or the sixteen-block area 313. For example, $N^0$=56, $N^1$=28, and $N^2$=14.

A second feature vector $x_2^f$ is obtained by performing raster scanning on the Fourier amplitude $|F_k^j(u, v)|$ except for high frequency components, as defined in Table 1. The raster scanning is carried on Fourier amplitude values in the order of the Fourier amplitude of the entire area 311 $|F_1^0(u, v)|$, the Fourier amplitudes of the four-block area 312 $|F_1^1(u, v)|$, $|F_2^1(u, v)|$, $|F_3^1(u, v)|$, and $|F_4^1(u, v)|$, and the Fourier amplitudes of the sixteen-block area 313 $|F_1^2(u, v)|$, $|F_2^2(u, v)|$, ..., $|F_{16}^2(u, v)|$.

The second feature vector $x_2^f$, which is obtained as a result of the raster scanning, can be expressed by Equation (8) below. Here, the dimension of the second feature vector $x_2^f$ is 856.

$$x_2^f = \begin{pmatrix} |F_1^0(0, 0)| \\ |F_1^0(1, 0)| \\ \vdots \\ |F_1^0(43, 13)| \\ |F_1^1(0, 0)| \\ |F_1^1(1, 0)| \\ \vdots \\ |F_4^1(21, 6)| \\ |F_1^2(0, 0)| \\ |F_2^2(1, 0)| \\ \vdots \\ |F_{16}^2(10, 2)| \end{pmatrix} \quad (8)$$

The second PCLDA projector 226 projects the second feature vector $x_2^f$, which is extracted by the second Fourier transformer 225, onto a discriminant space obtained by carrying out PCLDA on the second feature vector $x_2^f$. The discriminant space is defined by a second basis matrix $\Psi_2^f$, which is obtained using a predetermined well-known algorithm and is also well known to those skilled in the art.

The first vector normalizer 227 generates a first normalized vector $y_1^f$ by normalizing the first feature vector, projected onto the discriminant space by the first PCLDA projector 223. In addition, the first vector normalizer 227 generates a second normalized vector $y_2^f$ by normalizing the second feature vector, projected onto the discriminant space by the second PCLDA projector 226. The first and second normalized vectors $y_1^f$ and $y_2^f$ can be expressed by Equations (9) and (10), respectively.

$$y_1^f = \frac{\Psi_1^{f^T} x_1^f - m_1^f}{|\Psi_1^{f^T} x_1^f - m_1^f|} \quad (9)$$

$$y_2^f = \frac{\Psi_2^{f^T} x_2^f - m_2^f}{|\Psi_2^{f^T} x_2^f - m_2^f|} \quad (10)$$

In Equations (9) and (10), $m_1^f$ and $m_2^f$ represent averages of vectors projected onto the discriminant space by the first and second PCLDA projectors 223 and 226. The first and second normalized vectors $y_1^f$ and $y_2^f$ have dimensions of 70 and 80, respectively.

The central Fourier feature vector generator 230 obtains a Fourier spectrum and Fourier amplitude of the central face area 231 and generates a central Fourier feature vector using the Fourier spectrum and Fourier amplitude of the central face area 231. The central Fourier feature vector generator 230 operates in a similar way to the way the entire Fourier feature vector generator 220 operates. The operation of the central Fourier feature vector generator 230 will become more apparent in the following paragraphs.

The central face area 231 is obtained by clipping the normalized face image 110, which is represented by f(x, y), into a 32×32 image starting from a point (7, 12) and ending with a point (38, 43).

The third Fourier transformer 232 obtains a Fourier spectrum G(u, v) by converting the central face area 231, which is represented by g(x, y), into a frequency domain through Fourier transformation. A third feature vector $x_1^g$ is obtained by performing raster scanning on the Fourier spectrum G(u, v). Here, the raster scanning is performed on the scanning areas A and B, as defined in Table 1. The third feature vector $x_1^g$, which is obtained as a result of the raster scanning, is a dimension of 256.

The third PCLDA projector 233 projects the third feature vector $x_1^g$, which is extracted by the third Fourier transformer 232, onto a discriminant space obtained by carrying out PCLDA on the third feature vector $x_1^g$. The discriminant space is defined by a third basis matrix $\Psi_1^g$, which is obtained using a predetermined well-known algorithm and is also well known to those skilled in the art.

Figure 3B:
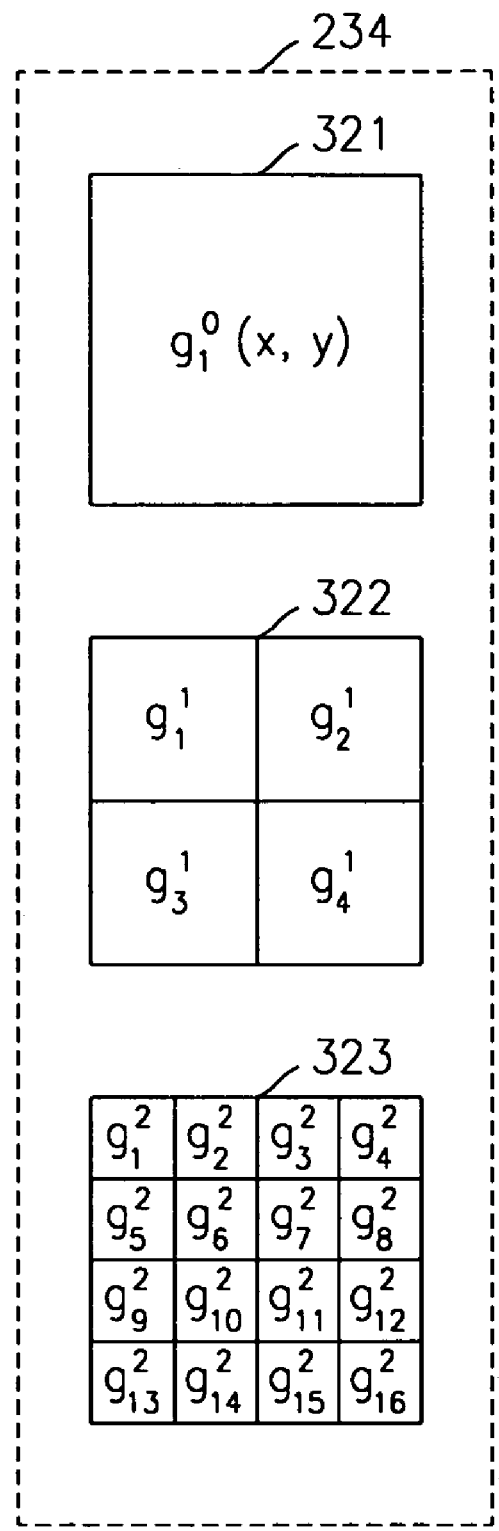

The fourth Fourier transformer 235 converts the block-divided face area 234 into a frequency domain by performing Fourier transformation on the block-divided face area 234. The block-divided face area 234 includes three sub-spaces, i.e., a 32×32-sized central area 321, which is represented by $g_1^0(x,y)$ and have a 32×32 size, a four-block area 322, which is represented by $g_k^1(x,y)$ and is constituted by four identical blocks having a 16×16 size, and a sixteen-block area 323, which is represented by $g_k^2(x,y)$ and is constituted by sixteen identical blocks having a 8×8 size, as shown in FIG. 3B. The Fourier transformation is performed on each of the sub-spaces of the block-divided face area 234. The central area 321 has a Fourier amplitude |G(u, v)|, and each of the sub-blocks $g_k^j(x, y)$ of the four-block area 322 and the sixteen-block area 323 has an amplitude $|G_k^j(u, v)|$. By performing raster scanning on these Fourier amplitudes, a fourth feature vector $x_2^g$ is obtained. The raster scanning is performed on the scanning areas A and B, as defined in Table 1 above. Here, the fourth feature vector $x_2^g$, which is obtained as a result of the raster scanning, is a dimension of 384.

The fourth PCLDA projector 236 projects the fourth feature vector $x_2^g$, which is extracted by the fourth Fourier transformer 235, onto a discriminant space obtained by carrying out PCLDA on the fourth feature vector $x_2^g$. The discriminant space is defined by a fourth basis matrix $\Psi_2^g$, which is obtained using a predetermined well-known algorithm and is also well known to those skilled in the art.

In order to generate a unit vector using an average $m_1^g$ of vectors projected onto the discriminant space by the third PCLDA projector 233, the second vector normalizer 237 normalizes the third feature vector. As a result of the normalization, a third normalized vector $y_1^g$ is obtained. In addition, in order to generate a unit vector using an average $m_2^g$ of vectors projected onto the discriminant space by the fourth PCLDA projector 236, the second vector normalizer 237 normalizes the fourth feature vector. As a result of the normalization, a fourth normalized vector $y_2^g$ is obtained. The third and fourth normalized vectors $y_1^g$ and $y_2^g$ have dimensions of 70 and 80, respectively.

FIG. 4 is a detailed block diagram of the entire Fourier feature vector generation unit 123 of FIG. 1. As shown in FIG. 4, the entire Fourier feature vector generation unit 123 includes a first coupler 410, a first LDA projector 420, and a first quantizer 430.

Referring to FIG. 4, the first coupler 410 couples the first and second normalized vectors $y_1^f$ and $y_2^f$, provided by the first vector normalizer 227 in the Fourier feature generation unit 121, into a single coupled vector having a dimension of, for example, 150.

The first LDA projector 420 projects the coupled vector, provided by the first coupler 410, onto a linear discriminant space defined by a fifth basis matrix $\Psi_3^f$, which is obtained using a predetermined well-known algorithm and is also well known to those skilled in the art. A resulting projected vector $z^f$ can be expressed by Equation (11) below.

$$z^f = \Psi_3^{f^T} \begin{pmatrix} y_1^f \\ y_2^f \end{pmatrix} \quad (11)$$

The first quantizer 430 clips and quantizes each component of the projected vector, provided by the first LDA projector 420, into a non-signed 5-bit integer, using Equation (12) below, and then stores a resulting vector as an entire Fourier feature vector $w_i^f$.

$$w_i^f = \begin{cases} 0 & \text{if } z_i^f < -16 \\ 31 & \text{if } z_i^f > 15 \\ \text{floor}(z_i^f + 16) & \text{otherwise} \end{cases} \quad (12)$$

FIG. 5 is a detailed block diagram of the central Fourier feature vector generation unit 125 of FIG. 1. As shown in FIG. 5, the central Fourier feature vector generation unit 125 includes a second coupler 510, a second LDA projector 520, and a second quantizer 530.

Referring to FIG. 5, the second coupler 510 couples the third and fourth normalized vectors $y_1^g$ and $y_2^g$, provided by the second vector normalizer 237 in the Fourier feature generation unit 121, into a single coupled vector having a dimension of, for example, 150.

The second LDA projector 520 projects the coupled vector, provided by the second coupler 510, onto a linear discriminant space defined by a sixth basis matrix $\Psi_3^g$, which is obtained using a predetermined well-known algorithm and is also well known to those skilled in the art. A resulting projected vector $z^g$ can be expressed by Equation (11) below.

The second quantizer 530 clips and quantizes each component of the projected vector $z^g$, provided by the second LDA projector 520, into a non-signed 5-bit integer, using Equation (13) below, and then stores a resulting vector as a central Fourier feature vector $w_i^g$.

$$w_i^g = \begin{cases} 0 & \text{if } z_i^g < -16 \\ 31 & \text{if } z_i^g > 15 \\ \text{floor}(z_i^g + 16) & \text{otherwise} \end{cases} \quad (13)$$

Figure 6:
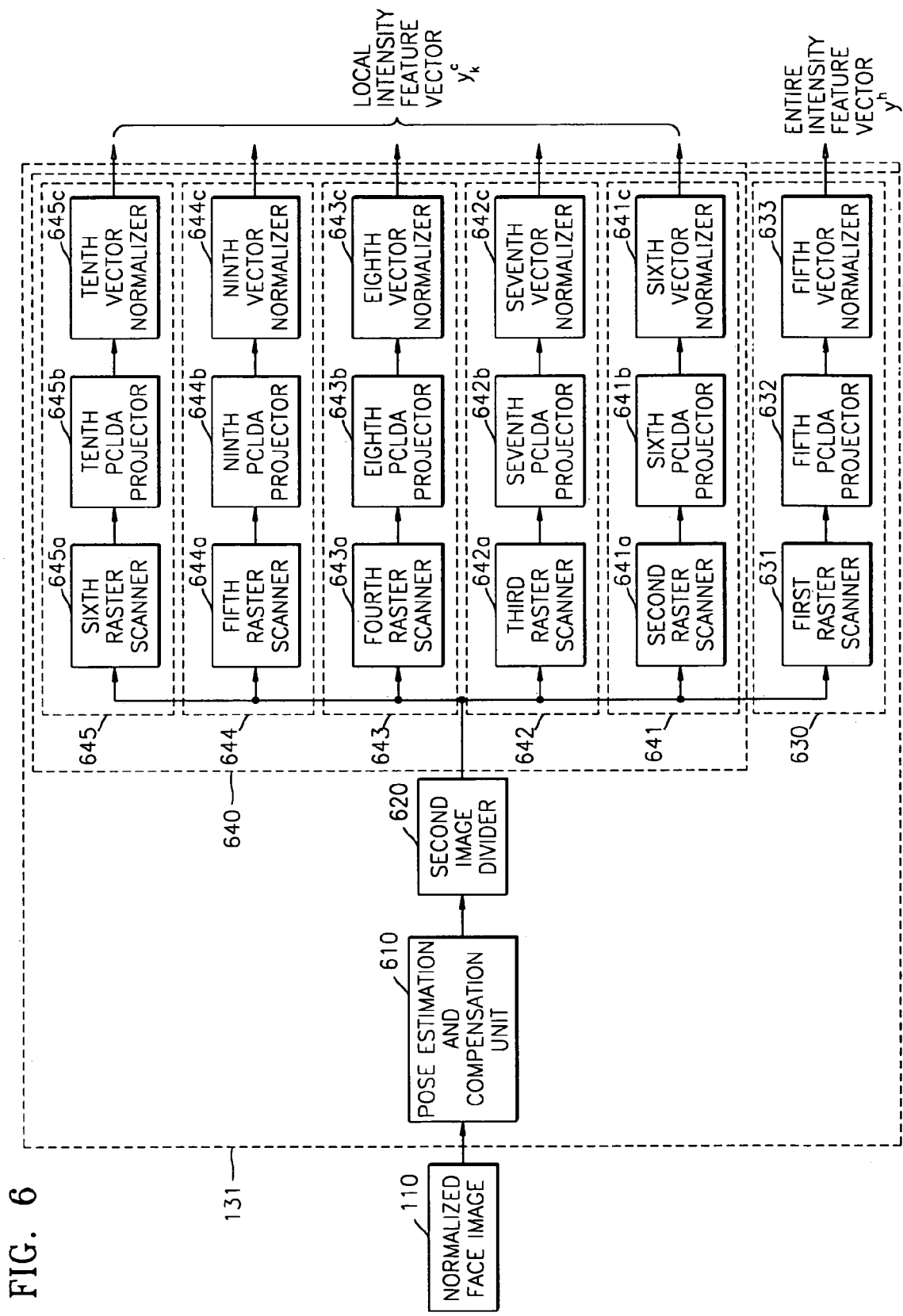
FIG. 6 is a detailed block diagram of an intensity feature generator shown in FIG. 1.

FIG. 6 is a detailed block diagram of the intensity feature vector generator 230 of FIG. 2. As shown in FIG. 6, the intensity feature vector generator 230 includes a pose estimation and compensation unit 610, a second image divider 620, an entire intensity feature vector generator 630, and a local intensity feature vector generator 640.

Referring to FIG. 6, the pose estimation and compensation unit 610 estimates a pose of the normalized face image 110, compensates for the normalized face image 110 based on the result of the pose estimation, and outputs a resulting frontal face image. The pose estimation and compensation unit 610 fix mismatches caused by variation in the pose of the normalized face image 110.

The second image divider 620 divides the pose-compensated face image output from the pose estimation and compensation unit 610 into an entire face area and first through fifth local images having face components 1 through 5, respectively. The entire face area has a predetermined raster scanning area, which is defined in Table 2 below. More specifically, the entire face area, starting from a point (0, 0), has a 46×56-size. The first through fifth local images start from points (9, 4), (6, 16), (17, 16), (7, 25), and (16, 25), respectively, and have 29×27, 24×21, 24×21, 24×24, and 24×24 sizes, respectively.

For example, the following table defines raster scanning areas and vector dimensions of face component-wise areas.

TABLE 2

| | Top Left | | Size | | Vector |
|---|---|---|---|---|---|
| | x | y | Width | Height | Dimension |
| Entire Face: $x^h$ | 0 | 0 | 46 | 56 | 2576 |
| Face Component 1: $x_1^c$ | 9 | 4 | 29 | 27 | 783 |
| Face Component 2: $x_2^c$ | 6 | 16 | 24 | 21 | 504 |
| Face Component 3: $x_3^c$ | 17 | 16 | 24 | 21 | 504 |
| Face Component 4: $x_4^c$ | 7 | 25 | 24 | 24 | 576 |
| Face Component 5: $x_5^c$ | 16 | 25 | 24 | 24 | 576 |

In the entire intensity feature vector generator 630, a first raster scanner 631 generates a fifth feature vector $x^h$, which is comprised of intensity values for the entire face area, by performing raster scanning on the entire face area along a column direction. The column-directional raster scanning is carried out starting with the top-left point (0, 0) of the entire face area and ending with the bottom right point (46, 56) of the entire face area. Here, the fifth feature vector $x^h$ has a dimension of, for example, 2576.

A fifth PCLDA projector 632 projects the fifth feature vector $x^h$, provided by the first raster scanner 631, onto a discriminant space defined by a seventh basis matrix $\Psi_1^h$, which is obtained using a predetermined well-known algorithm and is also well known to those skilled in the art.

A fifth vector normalizer 633 normalizes the projected vector into a unit vector $y^h$ and stores the unit vector $y^h$ as an entire intensity feature vector. The unit vector $y^h$ can be expressed by Equation (14) below.

$$y^h = \frac{\Psi_1^{hT} x^h - m^h}{|\Psi_1^{hT} x^h - m^h|} \tag{14}$$

In Equation (14), $m^h$ represents an average of vectors, projected on the discriminant space by the fifth PCLDA projector 632, and has a dimension of 40.

In the local intensity feature vector generator 640, second through sixth raster scanners 641a through 645a each generate a sixth feature vector $x_k^c$ (k=1, 2, ..., 5), which is comprised of intensity values for each of the local face areas, by performing raster scanning on each of the local face areas in the column direction. The column-directional raster scanning is carried out starting with the top-left point of each of the local face areas and ending with the bottom-right point of each of the local face areas. The sixth feature vector $x_k^c$ (k=1, 2, ..., 5) has a dimension of 783, 504, 504, 576, or 576 for each of the raster scanning areas defined in Table 2.

Sixth through tenth PCLDA projectors 641b through 645b project the sixth feature vector $X_k^c$ (k=1, 2, ..., 5), provided by each of the second through sixth raster scanners 641a through 645a, onto a discriminant space defined by an eighth basis matrix $\omega_k^c$ (k=1, 2, ..., 5), which is obtained using a predetermined well-known algorithm and is also well known to those skilled in the art.

Sixth through tenth vector normalizers 641c through 645c normalize the vector, projected onto the discriminant space by each of the sixth through tenth PCLDA projectors 641b through 645b, into a unit vector $y_k^c$ (k=1, 2, ..., 5) and store the unit vector $y_k^c$ as a local intensity feature vector. The unit vector $y_k^c$ can be defined by Equation (15) below.

$$y_k^c = \frac{\Psi_k^{cT} x_k^c - m_k^c}{|\Psi_k^{cT} x_k^c - m_k^c|} \tag{15}$$

In Equation (15), $m_k^c$ represents an average of vectors, projected on the discriminant space by each of the sixth through tenth PCLDA projectors 641b through 645b, and has a dimension of 40.

Figure 7:
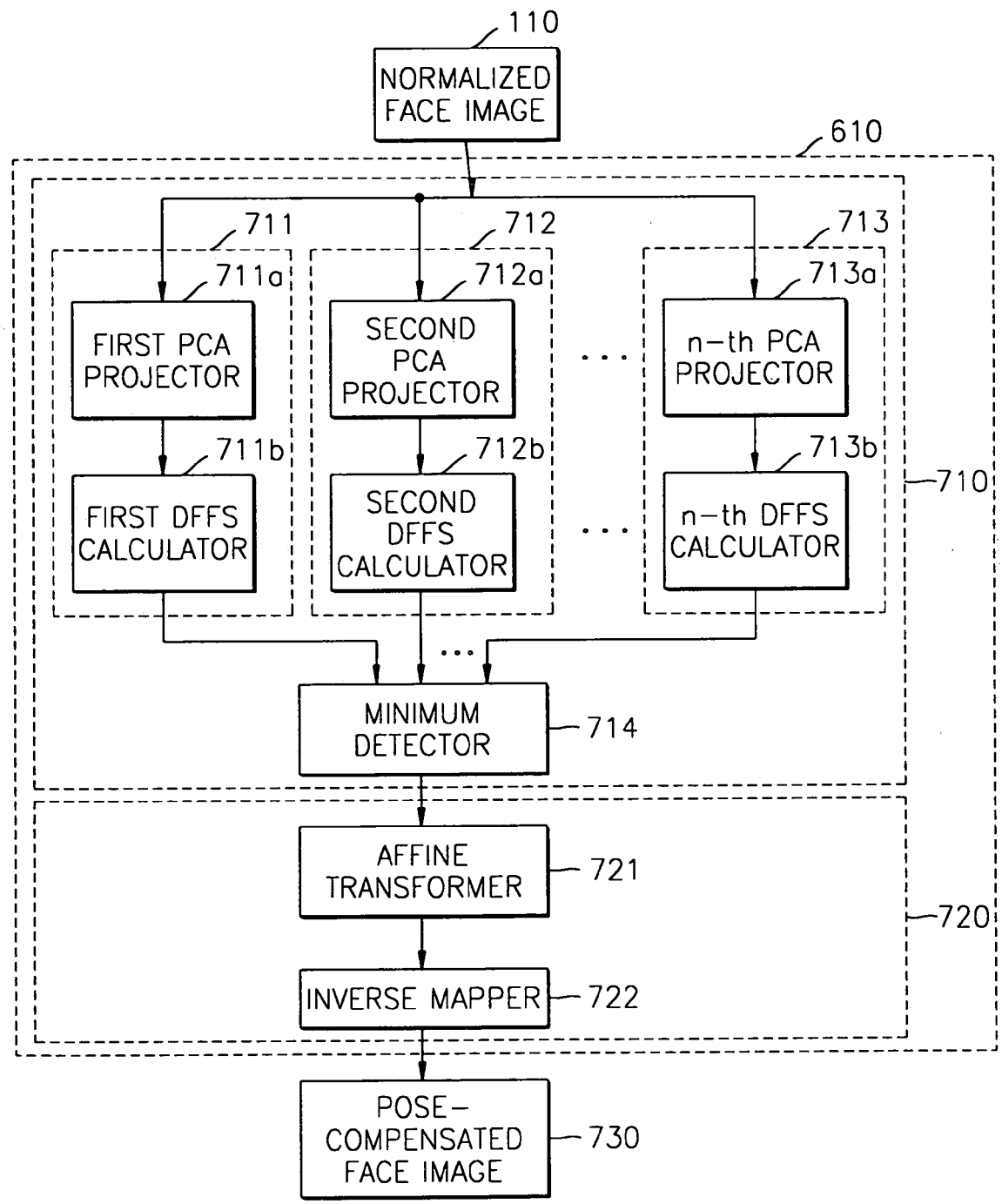
FIG. 7 is a detailed block diagram of a pose estimation/compensation unit shown in FIG. 6.

FIG. 7 is a detailed block diagram of the pose estimation and compensation unit 610 of FIG. 6. As shown in FIG. 7, the pose estimation and compensation unit 610 includes a pose estimator 710, which is comprised of n principal-component-analysis/distance-from-feature-space (PCA/DFFS) blocks 711, 712, and 713 and a minimum detector 714, and a pose compensator 720, which is comprised of an affine transformer 721 and an inverse mapper 722.

The pose estimator 710 estimates the pose of the normalized face image 110 to belong to one of the nine pose classes defined in Table (3) below, using a PCA/DFFS method. For this, first through n PCA projectors 711a, 712a, and 713a (here, n=9) project the normalized face image 110 onto a PCA sub-space of a projection matrix $P_i$ (i=1, 2, ..., 9) for each of the nine pose classes. A PCA model for each of the nine pose classes can be learned or obtained from exemplary images, collected from training face images. Face images having similar poses to those defined by the nine pose classes are determined as the distance for each pose class.

TABLE 3

| Pose ID | Definition |
|---|---|
| 1 | Upward |
| 2 | Slightly Upward |
| 3 | Leftward |
| 4 | Slightly Left |
| 5 | Front |
| 6 | Slightly Rightward |
| 7 | Rightward |
| 8 | Slightly Downward |
| 9 | Downward |

First through n-th DFFS calculators 711b, 712b, and 713b (here, n=9) calculate a distance $d_i(x)$ for each of the nine pose classes using Equation (16) below. The distance $d_i(x)$ represents how precisely a face can be represented by the PCA sub-space for a specific pose class.

$$d_i(x) = \|x\|^2 - \|P_i(x - M_i)\|^2 \tag{16}$$

In Equation (16), x and $M_i$ represent a vector obtained by column-wise raster scanning of the normalized face image result and an average vector of the PCA sub-space for a specific pose class (i), respectively. The projection matrix $P_i$ (i=1, 2, ..., 9) is obtained using a predetermined well-known algorithm and are also well known to those skilled in the art.

The minimum detector 714 detects a minimum among distances $d_i(x)$, provided by the first through n-th DFFS calculators 711b, 712b, and 713b (here, n=9), and estimates a predetermined pose class corresponding to the detected minimum as a pose class for the normalized face image 110, which is expressed by Equation (17) below.

$$i_{\min} = \arg\min_i \{d_i(x)\} \; i = 1, 2, ..., 9 \tag{17}$$

The above-described PCA/DFFS method is taught by B. Moghaddam and A. Pentland in "Face Recognition using View-based and Modular Eigenspaces," Automatic Systems for the Identification and Inspection of Humans, SPIE Vol. 2277, July 1994.

The pose compensator 720 compensates for the normalized face image 110 into a frontal face image according to the pose class estimated by the pose estimator 710. To make this happen, the affine transformer 721 loads a predetermined affine transformation matrix that brings about a frontal pose class corresponding to the estimated pose class. Affine transformation from a pose class to a frontal pose class depends on correspondence points between the pose class and the frontal pose class. Each pose class may have, for example, average locations of 15 distinctive face features, in detail, left and right edges at two eyebrows and eyes, left, right and bottom edges at nose, left, right, top and bottom edges at mouse as correspondence points. Such distinctive face features can be manually selected from a training image assigned to each pose class.

The inverse mapper 722 provides a pose-compensated face image 730 by geometrically inverse-mapping the normalized face image 110 into a frontal face image using the predetermined affine transformation matrix loaded into the affine transformer 721. Affine transformation from pose class (j) to the frontal face image is represented by a six-dimensional parameter $A_j = \{a, b, c, d, e,\}$, which is defined in Table 4 below, and these parameters are calculated by the ratio of distinctive face features in the frontal face image to those in each pose face image.

Intensity at a point (x, y) on the inverse-mapped face image can be calculated using bi-linear interpolation Formula (18) as described below.

$$(1-dy) \cdot \{(1-dx) \cdot f(x',y') + dx \cdot f(x'+1,y')\} + dy \cdot \{(1-dx) \cdot f(x', y'+1) + dx \cdot f(x'+1, y'+1)\} \tag{18}$$

In Formula (18), $x' = \text{ceil}(a \cdot x + b \cdot y + c)$, $y' = \text{ceil}(d \cdot x + e \cdot y + f)$, $dx = (a \cdot x + b \cdot y + c) - x'$, and $dy = (d \cdot x + e \cdot y + f) - y'$. $f(x', y')$ represents the intensity of the normalized face image 110 at a point $(x', y')$.

FIG. 8 is a detailed block diagram of the entire composite feature vector generation unit 133 of FIG. 1. As shown in FIG. 8, the entire composite feature vector generation unit 133 includes a third coupler 810, a third LDA projector 820, and a third quantizer 830.

Referring to FIG. 8, the third coupler 810 couples the first and second normalized vectors $y_1^f$ and $y_2^f$, provided by the first vector normalizer 227 in the Fourier feature generation unit 121, and the entire intensity feature vector $y^h$, provided by the entire intensity feature vector generator 630, into a single coupled vector having a dimension of, for example, 190.

The third LDA projector 820 projects the coupled vector, provided by the third coupler 810, onto a linear discriminant space defined by a ninth basis matrix $\Psi_2^h$, which is obtained using a predetermined well-known algorithm and is also well known to those skilled in the art. A resulting projected vector $z^h$ can be expressed by Equation (19) below.

$$z^h = \Psi_2^{h T} \begin{pmatrix} y_1^f \\ y_2^f \\ y^h \end{pmatrix} \tag{19}$$

The third quantizer 830 clips and quantizes each component of the projected vector $z^h$, provided by the third LDA projector 820, into a non-signed 5-bit integer, using Equation (20) below, and then stores a resulting vector as an entire composite feature vector $w_i^h$.

$$w_i^h = \begin{cases} 0 & \text{if } z_i^h < -16 \\ 31 & \text{if } z_i^h > 15 \\ \text{floor}(z_i^h + 16) & \text{otherwise} \end{cases} \tag{20}$$

FIG. 9 is a detailed block diagram of the central composite feature vector generation unit 135 of FIG. 1. As shown in FIG.

TABLE 4

| | \multicolumn{6}{c}{Pose Class} | | | | | |
|---|---|---|---|---|---|---|
| | a | b | c | d | e | f |
| 1 | 0.991580 | 0.010128 | 0.074633 | −0.003959 | 0.943660 | 1.515700 |
| 2 | 0.970768 | −0.002972 | 0.881806 | 0.003942 | 0.887513 | 2.570872 |
| 3 | 1.037537 | 0.119828 | −4.445840 | −0.008323 | 1.242277 | −5.354795 |
| 4 | 0.996640 | −0.073498 | 1.742925 | 0.004347 | 1.033041 | −0.724001 |
| 5 | 1.000000 | 0.000000 | 0.000000 | 0.000000 | 1.000000 | 0.000000 |
| 6 | 0.987388 | 0.086766 | −1.807056 | −0.003484 | 0.998318 | 0.264492 |
| 7 | 0.999838 | −0.128101 | 3.728913 | 0.013586 | 1.185747 | −4.659860 |
| 8 | 0.984965 | −0.000953 | 0.423803 | 0.002269 | 0.970589 | 0.884239 |
| 9 | 0.978864 | −0.003004 | 0.538113 | 0.011342 | 1.001916 | −0.477181 |

9, the central composite feature vector generation unit 135 includes a fourth coupler 910, a fourth LDA projector 920, and a fourth quantizer 930.

Referring to FIG. 9, the fourth coupler 910 couples the third and fourth normalized vectors $y_1^g$ and $y_2^g$, provided by the second vector normalizer 237 in the Fourier feature generation unit 121, and the local intensity feature vector $y_k^c$, provided by the local intensity feature vector generator 640, into a single coupled vector that has, for example, a dimension of 350.

The fourth LDA projector 920 projects the coupled vector, provided by the fourth coupler 910, onto a linear discriminant space defined by a tenth basis matrix $\Psi_6^c$ which is obtained using a predetermined well-known algorithm and is also well known to those skilled in the art. A resulting projected vector $z^c$ can be expressed by Equation (21) below.

$$z^c = \Psi_6^{cT} \begin{pmatrix} y_1^g \\ y_2^g \\ y_1^c \\ y_2^c \\ y_3^c \\ y_4^c \\ y_5^c \end{pmatrix} \quad (21)$$

The fourth quantizer 930 clips and quantizes each component of the projected vector, provided by the fourth LDA projector 920, into a non-signed 5-bit integer, using Equation (22) below, and then stores a resulting vector as a central composite feature vector $w_i^c$.

$$w_i^c = \begin{cases} 0 & \text{if } z_i^c < -16 \\ 31 & \text{if } z_i^c > 15 \\ \text{floor}(z_i^c + 16) & \text{otherwise} \end{cases} \quad (22)$$

The first through tenth basis matrices that have been mentioned above (or the projection matrix) are taught by Taekyun Kim in "Component-based LDA face Descriptor for Image Retrieval," British Machine Vision Conference 2002, September 2002.

Hereinafter, the face image-retrieval performance of the method of extracting feature vectors according to the present invention will be described in greater detail.

For an experiment on the method of extracting feature vectors according to the present invention, a set of MPEG-7 face image data, which is comprised of five databases, are used. These five databases are an MPEG-7 face image database (E1) of expansion version 1, an Altkom database (A2), a MPEG-7 test set (M3) in an XM2VTS database, a FERET database F4, and an MPEG-7 test set (B5) in a Banca database. The total number of images that are used in this experiment is 11,845. Among the 11,845 images, 3,655 images are simply used as training images for LDA projection, and the rest are used as test images for evaluating the performance of an image searching algorithm according to the present invention. Of those test images, 4,190 images are used as basis images for extracting face feature vectors and the others are used as images for face searching. Table 5 shows detailed information on training images and test images used in this experiment. General information on each image used in this experiment is given in advance for making it possible to evaluate the performance of the image retrieval algorithm according to the present invention.

TABLE 5

| | DB | Person | Image | Total |
|---|---|---|---|---|
| Trainning Image I 50vs50 | Altkom | 40 | 15 | 600 |
| | Banca | — | — | — |
| | MPEG | 317 | 5 | 1,585 |
| | XM2VTS | 147 | 10 | 1,470 |
| | FERET | — | — | — |
| Total | | 504 | | 3,655 |
| Test Image I 50vs50 | Altkom | 40 | 15 | 600 |
| | Banca | 52 | 10 | 520 |
| | MPEG | 318 | 5 | 1,590 |
| | XM2VTS | 148 | 10 | 1,480 |
| | FERET | — | — | 4,000 |
| Total | | 558 | | 8,190 |

The precision of retrieval, carried out by the image retrieval algorithm according to the present invention, is measured based on average normalized modified retrieval rate (ANMRR), which is taught by B. S. Manjunath, Philippe Salembier, and Thomas Sikora in "Introduction to MPEG-7: Multimedia Content Description Interface," John Wiley & Sons Ltd., 2002.

According to the experiment results, the retrieval precision of the image retrieval algorithm according to the present invention is 0.354 when using a Fourier feature vector only and is 0.390 when using an intensity feature vector only. When using both the Fourier feature vector and the intensity feature vector, the retrieval precision of the image retrieval algorithm according to the present invention is 0.266. The sizes of a conventional Fourier feature vector and the intensity feature vector are 240 (=48×5) bits and 200(=40×5) bits, respectively, while the size of a Fourier feature vector according to the present invention is 320 (=64×5) bits. The retrieval precision of the image retrieval algorithm according to the present invention varies depending on the size of feature vector. For example, when the size is 48 (i.e., 240 bits), ANMRR is 0.280. When the size is 64 (i.e., 320 bits), ANMRR is 0.266. When the size is 128 (i.e., 640 bits), ANMRR is 0.249. This means, as described before, that using more size of feature vector increases retrieval precision while computational load is also slightly increased. Moreover, all of these results show that it is possible to provide a precision retrieval technique and bring about excellent identification results by using both the Fourier feature vector and the intensity feature vector like in the present invention.

The present invention can be realized as computer-readable codes that can be written on a computer-readable recording medium. The computer-readable medium includes nearly all sorts of recording devices on which computer-readable data can be written. For example, the computer-readable recording medium includes ROM, RAM, CD-ROM, a magnetic tape, a floppy disk, an optical data storage, and carrier waves, such as data transmission through the Internet. The computer-readable recording medium can also be distributed over a plurality of computer systems that are connected to a network. Therefore, the computer-readable codes can be recorded on the computer-readable recording medium and can be executed in a decentralized manner.

As described above, according to the present invention, a frequency feature vector or composite feature vector can be selectively used depending on the specification of a face recognition and retrieval system. In addition, according to the present invention, it is possible to overcome the limits of conventional retrieval techniques using a frequency domain feature vector only or using a spatial domain feature vector only and to considerably enhance image-retrieval precision by separately generating a Fourier feature vector and an intensity feature vector for a predetermined normalized face image and then merging these two feature vectors into a single composite feature vector.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of extracting feature vectors for face recognition and retrieval, comprising
    (a) generating an entire Fourier feature vector for an entire face area of a normalized face image, and generating a central Fourier feature vector for a central face area of the normalized face image; and
    (b) generating an entire intensity feature vector for the entire face area, generating an entire composite feature vector using a first vector generated from a Fourier transformation of the entire face area and the entire intensity feature vector, generating a local intensity feature vector for a predetermined number of face component-wise areas, and generating a central composite feature vector using a second vector generated from the Fourier transformation of the central face area and the local intensity feature vectors.

2. The method of claim 1, wherein the step (a) comprises:
    (a1) obtaining a Fourier spectrum and Fourier amplitude for the entire face area by performing Fourier transformation on the entire face area, and defining first and second feature vectors using the Fourier spectrum and Fourier amplitude obtained for the entire face area;
    (a2) obtaining a Fourier spectrum and Fourier amplitude for the central face area by performing Fourier transformation on the central face area, and defining third and fourth feature vectors using the Fourier spectrum and Fourier amplitude obtained for the central face area;
    (a3) generating the first and second normalized vectors by projecting the first and second feature vectors onto a first PCLDA sub-space and normalizing resulting feature vectors, and generating the entire Fourier feature vector by coupling the first and second normalized vectors into a single coupled vector and projecting the single coupled vector onto a first linear discriminant space; and
    (a4) generating the third and fourth normalized vectors by projecting the third and fourth feature vectors onto a second PCLDA sub-space and normalizing resulting feature vectors, and generating the central Fourier feature vector by coupling the third and fourth normalized vectors into a single coupled vector and projecting the single coupled vector onto a second linear discriminant space.

3. The method of claim 2, wherein in the step (a1), the Fourier spectrum is obtained from the entire face area, and the Fourier amplitude is obtained from a first block-divided face area.

4. The method of claim 3, wherein the first block-divided face area comprises an entire area, which is obtained by clipping the entire face area into a predetermined-sized image, a four-block area, which is obtained by dividing the entire area into four blocks, and a sixteen-block area, which is obtained by dividing the entire area into sixteen blocks.

5. The method of claim 2, wherein in the step (a2), the Fourier spectrum is obtained from the central face area, and the Fourier amplitude is obtained from a second block-divided area.

6. The method of claim 5, wherein the second block-divided face area comprises a central area, which corresponds to the central face area, a four-block area, which is obtained by dividing the central area into four blocks, and a sixteen-block area, which is obtained by dividing the central area into sixteen blocks.

7. The method of claim 1, wherein the step (b) comprises:
    (b1) generating first and second normalized vectors for the entire face area of the normalized face image, and generating third and fourth normalized vectors for the central face area of the normalized face image;
    (b2) generating an entire intensity feature vector for the entire face area and a local intensity feature vector for a predetermined number of face component-wise areas;
    (b3) generating an entire composite feature vector by coupling the first and second normalized vectors and the entire intensity feature vector into a single coupled vector and projecting the coupled vector onto a third linear discriminant space; and
    (b4) generating a central composite feature vector by coupling the third and fourth normalized vectors and the local intensity feature vector into a single coupled vector and projecting the coupled vector onto a fourth linear discriminant space.

8. The method of claim 7, wherein the step (b2) comprises:
    (b21) converting the normalized face image into a frontal face image by performing pose estimation and compensation on the normalized face image;
    (b22) defining a fifth feature vector by performing raster scanning on the entire face area of a resulting pose-compensated face image;
    (b23) defining a sixth feature vector by performing raster scanning on a plurality of face component-wise areas of the pose-compensated face image;
    (b24) generating the entire intensity feature vector by projecting the fifth feature vector onto a third PCLDA sub-space and normalizing a resulting feature vector into a fifth unit vector; and
    (b25) generating the local intensity feature vector by projecting the sixth feature vector onto a fourth PCLDA sub-space and normalizing a resulting feature vector into a sixth unit vector.

9. The method of claim 8, wherein in the step (b21), a pose of the normalized face image is estimated using a PCA-DFFS method.

10. The method of claim 7, wherein the step (b3) comprises:
    (b31) coupling the first and second normalized vectors, generated in (b1), with the entire intensity feature vector, generated in (b2), into a single coupled vector;
    (b32) projecting the coupled vector onto the third linear discriminant space; and
    (b33) quantizing each component of the projected vector and storing a resulting vector as the entire composite feature vector.

11. The method of claim 7, wherein-the step (b4) comprises:
    (b41) coupling the third and fourth normalized vectors, generated in (b1), with the local intensity feature vector, generated in (b2), into a single coupled vector;
    (b42) projecting the coupled feature vector onto the fourth linear discriminant space; and (b43) quantizing each component of the projected vector and storing a resulting vector as the central composite feature vector.

12. A method of extracting feature vectors for face recognition and retrieval, comprising
   (a) generating an entire Fourier feature based on a cascaded LDA of Fourier characteristics of an entire face area of a normalized face image and generating a central Fourier feature based on a cascaded LDA of Fourier characteristics of a central face area of the normalized face image;
   (b) generating an entire intensity vector for the entire face area, generating an entire composite feature based on a cascaded LDA of a first vector generated from a Fourier transformation of the central face area and the entire intensity vector, generating a subregion intensity vector for a predetermined number of face component-wise areas, and generating a subregion composite feature based on a cascaded LDA of a second vector generated from the Fourier transformation of the central face area and the subregion intensity vector; and
   (c) outputting either the entire Fourier feature and the central Fourier feature or the composite feature and the subregion composite feature for the face recognition and retrieval.

13. A computer-readable recording medium on which a program enabling the method of claim 1 is recorded.

14. A computer-readable recording medium on which a program enabling the method of claim 12 is recorded.

15. An apparatus for extracting feature vectors for face recognition and retrieval, the apparatus comprising:
   a first unit which generates an entire Fourier feature vector for an entire face area of a normalized face image, and generates a central Fourier feature vector for a central face area of the normalized face image; and
   a second unit which generates an entire intensity feature vector for the entire face area, generates an entire composite feature vector using a first vector generated from a Fourier transformation of the entire face area and the entire intensity feature vector, generates a local intensity feature vector for a predetermined number of face component-wise areas, and generates a central composite feature vector using a second vector generated from a Fourier transformation of the central face area and the local intensity feature vector.

16. The apparatus of claim 15, wherein the first unit comprises:
   a Fourier feature generator which generates first and second normalized vectors for the entire face area of the normalized face image and third and fourth normalized vectors for the central face area;
   an entire Fourier feature vector generator which generates an entire Fourier feature vector by coupling the first and second normalized vectors into a single coupled vector and projecting the coupled vector onto a first linear discriminant space; and
   a central Fourier feature vector generator which generates a central Fourier feature vector by coupling the third and fourth normalized vectors into a single coupled vector and projecting the coupled vector onto a second linear discriminant space.

17. The apparatus of claim 15, wherein the second unit comprises:
   a Fourier feature generator which generates first and second normalized vectors for the entire face area of the normalized face image and third and fourth normalized vectors for the central face area of the normalized face image;
   an intensity feature generator which generates an entire intensity feature vector for the entire face area and a local intensity feature vector for a predetermined number of face component-wise areas;
   an entire composite feature vector generator which generates an entire composite feature vector by coupling the first and second normalized vectors with the entire intensity feature vector; and
   a central composite feature vector generator which generates a central composite feature vector by coupling the third and fourth normalized vectors with the local intensity feature vector.

18. The apparatus of claim 17, wherein the Fourier feature generator comprises:
   an entire Fourier feature vector generator which generates the first and second normalized vectors by projecting first and second feature vectors that are defined by a Fourier spectrum and Fourier amplitude, obtained by Fourier-transforming the entire face area, onto a first PCLDA sub-space and normalizing resulting feature vectors; and
   a central Fourier feature vector generator which generates the third and fourth normalized vectors by projecting third and fourth feature vectors that are defined by a Fourier spectrum and Fourier amplitude, obtained by Fourier-transforming the central face area, onto a second PCLDA sub-space and normalizing resulting feature vectors.

19. The apparatus of claim 18, wherein the Fourier spectrum used in the entire Fourier feature vector generator is obtained from the entire face area and the Fourier amplitude for the entire face area is obtained from an entire area, which is obtained by clipping the entire face area into a predetermined-sized area, a four-block area, which is obtained by dividing the entire area into four blocks, and a sixteen-block area, which is obtained by dividing the entire area into sixteen blocks.

20. The apparatus of claim 18, wherein the Fourier spectrum used in the central Fourier feature vector generator is obtained from the central face area and the Fourier amplitude for the central face area is obtained from a central area, a four-block area, which is obtained by dividing the central area into four blocks, and a sixteen-block area, which is obtained by dividing the central area into sixteen blocks.

21. The apparatus of claim 17, wherein the intensity feature generator comprises:
   a pose estimation and compensation unit which estimates a pose of the normalized face image and converts the normalized face image into a frontal face image based on the result of the estimation;
   an entire intensity feature vector generator which generates the entire intensity feature vector by projecting a fifth feature vector that is obtained by performing raster scanning on the entire face area of the normalized face image onto a third PCLDA sub-space and normalizing a resulting feature vector into a fifth unit vector; and
   a local intensity feature vector generator which generates the local intensity feature vector by projecting a sixth feature vector that is obtained by performing raster scanning on a plurality of face component-wise areas of a pose-compensated face image onto a fourth PCLDA sub-space and normalizing a resulting feature vector into a sixth unit vector.

* * * * *